United States Patent
Davydov et al.

(10) Patent No.: US 9,577,778 B2
(45) Date of Patent: Feb. 21, 2017

(54) INTERFERENCE REDUCTION USING HYBRID SIGNALING

(71) Applicant: INTEL CORPORATION, San Jose, CA (US)

(72) Inventors: Alexei Davydov, Nizhny Novgorod (RU); Gregory V. Morozov, Nizhny Novgorod (RU); Gi Wan Choi, San Jose, CA (US)

( * ) Notice: Subject to any disclaimer, the term of this patent is extended or adjusted under 35 U.S.C. 154(b) by 27 days.

(21) Appl. No.: 14/582,346

(22) Filed: Dec. 24, 2014

(65) Prior Publication Data

US 2015/0245366 A1 Aug. 27, 2015

Related U.S. Application Data

(60) Provisional application No. 61/943,969, filed on Feb. 24, 2014.

(51) Int. Cl.
| | |
|---|---|
| *H04J 11/00* | (2006.01) |
| *H04L 5/00* | (2006.01) |
| *H04L 1/00* | (2006.01) |
| *H04W 72/08* | (2009.01) |
| *H04B 15/00* | (2006.01) |
| *H04B 1/00* | (2006.01) |
| *H04B 1/10* | (2006.01) |

(52) U.S. Cl.
CPC ............ *H04J 11/0056* (2013.01); *H04B 1/10* (2013.01); *H04B 15/00* (2013.01); *H04L 1/0038* (2013.01); *H04L 5/0073* (2013.01); *H04W 72/082* (2013.01); *H04L 5/0053* (2013.01); *H04L 5/0091* (2013.01)

(58) Field of Classification Search
CPC ........ H04B 1/10; H04B 15/00; H04J 11/0056; H04L 1/0038; H04L 5/0053; H04W 72/082

See application file for complete search history.

(56) References Cited

U.S. PATENT DOCUMENTS

| | | |
|---|---|---|
| 8,503,338 B2 | 8/2013 | Jngren et al. |
| 2010/0069084 A1 | 3/2010 | Parkvall et al. |
| 2010/0238888 A1* | 9/2010 | Sampath ............... H04W 24/02 370/329 |

(Continued)

FOREIGN PATENT DOCUMENTS

WO   WO 2011/014709 A1   2/2011

OTHER PUBLICATIONS

3GPP; 3rd Generation Partnership Project; Technical Specification Group Radio Access Network; Network-Assisted Interference Cancellation and Suppression for LTE; 3GPP TR 36.866 v1.0.0; Nov. 2013; 59 pages; Release 12.

(Continued)

*Primary Examiner* — Redentor Pasia
(74) *Attorney, Agent, or Firm* — Thorpe North & Western

(57) ABSTRACT

Technology for reducing signal interference is disclosed. Semi-static signaling can be received at a user equipment (UE) from a neighboring evolved node (eNB). The semi-static signaling can include potential configurations of signal parameters used at the neighboring eNB. The UE can receive dynamic signaling from the neighboring eNB that includes a subset of the potential configurations of signal parameters used at the neighboring eNB. Signal interference that is caused by the neighboring eNB can be reduced using the semi-static signaling and the dynamic signaling.

25 Claims, 7 Drawing Sheets

(56) References Cited

U.S. PATENT DOCUMENTS

| | | | |
|---|---|---|---|
| 2011/0044269 A1* | 2/2011 | Fan | H04B 1/7105 370/329 |
| 2014/0051426 A1* | 2/2014 | Siomina | H04W 36/0088 455/422.1 |
| 2014/0198766 A1* | 7/2014 | Siomina | H04W 72/082 370/330 |
| 2015/0009964 A1* | 1/2015 | Ellenbeck | H04W 48/16 370/336 |
| 2015/0147994 A1* | 5/2015 | Tsai | H04B 1/1027 455/296 |
| 2015/0172035 A1* | 6/2015 | Xu | H04L 5/0073 370/329 |
| 2015/0222304 A1* | 8/2015 | Xu | H04B 1/0475 370/329 |
| 2015/0256280 A1* | 9/2015 | Park | H04J 11/005 370/329 |
| 2015/0358105 A1* | 12/2015 | Jung | H04J 11/0056 370/329 |
| 2015/0365178 A1* | 12/2015 | Maattanen | H04B 17/345 370/329 |
| 2015/0372778 A1* | 12/2015 | Xu | H04J 11/005 370/329 |
| 2015/0373732 A1* | 12/2015 | Davydov | H04L 5/00 370/329 |
| 2015/0382371 A1* | 12/2015 | Liu | H04B 7/024 370/329 |
| 2016/0021565 A1* | 1/2016 | Kim | H04L 5/005 370/329 |
| 2016/0065258 A1* | 3/2016 | Lee | H04B 1/1027 375/346 |

OTHER PUBLICATIONS

Ruya Yan et al., 'an Effective Semi-static Interference Coordination Scheme for Wireless Cellular Systems', 2013 Wireless Telecommunications Symposium (WTS), Apr. 17-19, 2013.

* cited by examiner

INTERFERENCE REDUCTION USING HYBRID SIGNALING

RELATED APPLICATIONS

The present application claims priority to U.S. Provisional Patent Application No. 61/943,969, filed Feb. 24, 2014, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
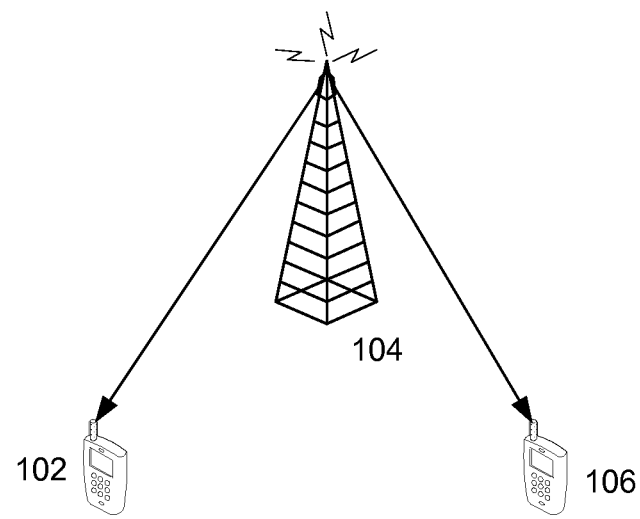
FIG. 1A illustrates intra-cell interference between multiple user equipments (UEs) within the same cell in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for reducing signal interference at a user equipment (UE) using network-assisted interference cancellation and suppression (NAICS). The UE can be served by a serving evolved node B (eNB). The UE can be adjacent to a cell edge within a cell that is served by the serving eNB. In a neighboring cell, a neighboring eNB may cause signal interference for the UE. In order to enable the UE to mitigate the signal interference, the neighboring eNB can periodically send semi-static signaling to the UE. In one configuration, the neighboring eNB can send the semi-static signaling to the UE via the serving eNB. For example, the neighboring eNB can send the semi-static signaling to the serving eNB via a backhaul link, and then the serving eNB can forward the semi-static signaling via a unicast transmission.

The semi-static signaling can include potential configurations of signal parameters used at the neighboring eNB. For example, the semi-static signaling can include a physical resource block (PRB) allocation granularity, a subset of supported transmission modes, an indication that PRB hopping is used at the neighboring eNB, a maximum number of layers for downlink transmission, a maximum modulation order, an uplink-downlink configuration of a frame, a subset of power offsets values, and/or a subset of scrambling identities for a defined transmission mode. The UE can use the potential configurations of signal parameters in the semi-static signaling to reduce the signal interference from the neighboring eNB. For example, the UE can perform blind detection based on the potential configurations of signal parameters in order to reduce the signal interference.

In addition, the neighboring eNB can send dynamic signaling directly to the UE that includes a subset of the potential configurations of signal parameters. The subset of the potential signal parameter configurations can be used in a given downlink subframe at the neighboring eNB. In one example, the subset of the potential configurations of signal parameters is an actual configuration of signal parameters used at the neighboring eNB (as opposed to a range of possible configurations as provided in the semi-static signaling). The neighboring eNB can be triggered to send the dynamic signaling upon selecting at least one of the potential configurations of signal parameters or modifying signal parameters in an existing configuration. The dynamic signaling can also include the physical resource block (PRB) allocation granularity, the subset of supported transmission modes, the indication that PRB hopping is used at the neighboring eNB, a maximum number of layers for downlink transmission, the maximum modulation order, an uplink-downlink configuration of a frame, a subset of power offsets values, and/or the subset of scrambling identities for a defined transmission mode. However, the dynamic signaling can be more accurate and up-to-date as compared to the semi-static signaling. The UE can use the subset of the potential configurations of signal parameters in the dynamic signaling to reduce the signal interference from the neighboring eNB.

The capacity of Third Generation Partnership Project (3GPP) Long Term Evolution (LTE) Advanced (LTE-A) networks can be improved by the deployment of heterogeneous networks to achieve cell-splitting gains and multi-user (MU) multiple-input multiple-output (MIMO). In both scenarios, co-channel interference, either from inter-cell users or co-scheduled intra-cell users, is expected to become the dominant limiting factor for achieving higher network capacity. Although MU-MIMO transmissions can significantly increase the cell throughput (or cell capacity) compared to single-user (SU) transmissions due to MU diversity, users scheduled for MU-MIMO can experience strong signal interference if the channel state information at the base station, or evolved node B (eNB), is outdated or in small cells with a limited number of users available. In MU-MIMO, the throughput of the user equipments (UEs) can depend on the amount of interference from co-scheduled users. The signal interference can be managed either at the eNB through efficient precoding, or at the UE via interference cancellation. In order to mitigate the signal interference at the UE, the UE can exploit information about the interfering data stream in the decoding process, which can result in a performance gain through reduction of the signal interference.

FIG. 1A illustrates intra-cell interference between multiple user equipments (UEs) within the same cell. An evolved node B (eNB) 104 can serve both a first UE 102 and a second UE 106. The first UE 102 and the second UE 106 can be within the same cell (i.e., intra-cell). In addition, the first UE 102 and the second UE 106 can transmit data using the same carrier frequency. The intra-cell interference between the first UE 102 and the second UE 106 can occur in either the uplink (UL) or downlink (DL) direction.

Figure 1B:
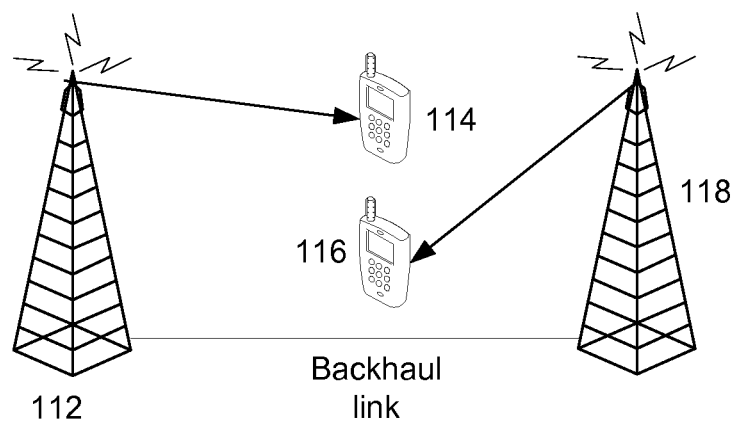
FIG. 1B illustrates inter-cell interference between multiple user equipments (UEs) within adjacent cells in accordance with an example.

FIG. 1B illustrates inter-cell interference between multiple UEs within adjacent cells. For example, a first UE 114 can be served by a first eNB 112, and a second UE 116 can be served by a second eNB 118. The first UE 114 and the second UE 116 can be within adjacent cells. The first UE 114 can experience interference from the second eNB 118, and the second UE 116 can experience interference from the first eNB 112 (i.e., inter-cell interference). In one example, both the first UE 114 and the second UE 116 can be located at a cell edge within their respective cells, and as a result, are more prone to endure interference from the eNB in the neighboring cell. The first UE 114 can endure the interference when the second UE 116 is concurrently sending or receiving data. In addition, the first eNB 112 and the second eNB 118 can be connected via a backhaul link.

In conventional 3GPP LTE Release 11 systems, such interference can be mitigated using coordinated multi-point (CoMP) techniques, which helps to avoid interference at the transmitting base station (i.e., network side). These coordinated transmissions between neighboring cells can reduce interference in the downlink. In addition, performing interference mitigation at the UE side by accounting for spatial properties of the interference has also shown promising gains in spectral efficiency. Further enhancements for interference mitigation at the receiver side can be achieved by considering more advanced receiver algorithms, which may utilize additional information about interference structure. For example, UEs can be provided with side knowledge of the interference such as, but not limited to, the transmission modes, resource allocation granularity, interference presence, and reference symbols. The UEs can also be referred to as interference-cancellation receivers or suppression receivers. Thus, further enhancements to intra-cell and inter-cell interference at the receiver side can be achieved by increasing the degree of knowledge about interfering transmissions to the UE with possible coordination from the network. Such interference-cancellation receivers can be considered for performance improvement of different physical channels, such as the physical downlink shared channel (PDSCH), the physical downlink control channel (PDCCH), the enhanced downlink control channel (EPDCCH), etc.

The UE can reduce interference and improve throughput performance by using linear processing techniques. More advanced receiver structures can use non-linear techniques. Non-linear structures can utilize additional information (e.g. parameters) on the interfering signals. In other words, the UE can perform interference suppression if certain parameters about the interfering signal are known to the UE. These parameters describing the interfering signal can include a modulation order, a precoding matrix indicator (PMI), number of layers, transmission modes, etc. As an example, the UE can use the modulation order to know that the interfering signal is not an arbitrary signal, but rather occurs at specific points. The UE can utilize such information to better suppress the interference from neighboring cells. In one configuration, such parameters can be estimated at the UE receiver from the received signal. In other words, the UE can detect the interfering signal (e.g., from an eNB in an adjacent cell), and then estimate these signal parameters from the interfering signal. However, in some cases, estimation of the signal parameters from the interfering signal can be unreliable and complex for practical implementations. In addition, estimation of the signal parameters can result in additional power usage at the UE.

To reduce the complexity of the UE and improve the performance, semi-static signaling of the interfering signal parameters is being considered in 3GPP Technical Report (TR) 36.866. In other words, the UE can utilize network assistance (e.g., receipt of semi-static signaling) in order to acquire the signal parameters of the interfering signal, rather than the UE estimating the signal parameters itself. One drawback of such approach is that semi-static signaling implies the semi-static restriction of the indicated parameters over a large number of frames. In other words, the UE can perform interference suppression using the signal parameters in the semi-static signaling, but if the signal parameters change over time, the UE may not become aware of the changes because the signaling is "semi-static" or not as frequent. Therefore, the UE can continue to perform interference suppression using outdated signal parameters. Such long-term restriction can degrade the performance on the interference cell, and therefore is not desirable.

The eNB that is causing interference for the UE (via the interfering signal) can be referred to as a neighboring eNB. The eNB that is causing the interference can also be referred to as an aggressor eNB or an interfering eNB. When the neighboring eNB reconfigures some of the signal parameters, the UE may not receive the updated reconfiguration in a timely manner through semi-static signaling. In traditional techniques, the neighboring eNB can communicate the reconfiguration of the signal parameters to other eNBs. Each of the other eNBs, upon receiving the reconfigured signal parameters from the neighboring eNB, can process or incorporate the interfering eNB's reconfigured signal parameters. Thus, each reconfiguration of signal parameters at the neighboring eNB results in a relatively large amount of signaling between the other eNBs. As a result, the UE may not receive the updated configuration of the signal parameters in a timely manner, and can continue to use outdated signal parameter configurations to perform interference reduction or suppression.

Therefore, the current technology describes providing semi-static signaling to the UE, as well as dynamic signaling from the neighboring cell (or neighboring eNB). The semi-static signaling can indicate one or more possible interference configurations on the neighboring cell (or the neighboring eNB). The dynamic signaling can indicate an actual interference configuration that has been realized in a given subframe of the neighboring eNB. The dynamic signaling can be directly communicated to the UE from the neighboring eNB. The UE can use both the semi-static signaling and the dynamic signaling to reduce or suppress interference from the neighboring eNB in a neighboring cell. In other words, the UE can use hybrid signaling (i.e., both the semi-static signaling and the dynamic signaling) for reducing the interference. Alternatively, the UE can use both the semi-static signaling and the dynamic signaling to reduce or suppress interference from other UEs within the same cell. By providing the dynamic signaling to the UE in addition to the semi-static signaling, the previous long-term restriction of the signal parameters for performing interference reduction can be eliminated. In addition, the hybrid signaling can reduce complexity at the UE by relieving the UE of independently determining the signal parameters.

Figure 2:
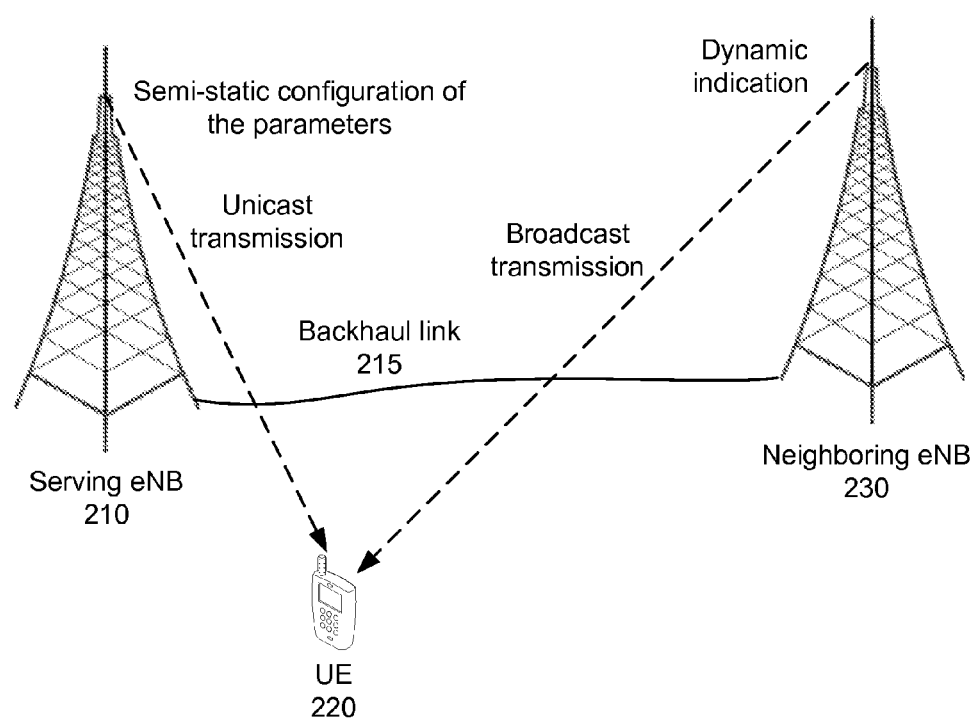
FIG. 2 illustrates semi-static signaling between a neighboring evolved node B (eNB) and a user equipment (UE) and dynamic signaling between the neighboring eNB and the UE for interference mitigation at the UE in accordance with an example.

FIG. 2 illustrates providing semi-static signaling and dynamic signaling to a user equipment (UE) 220 to enable the UE 220 to perform signal interference mitigation. The UE 220 can be within a cell that is served by a serving evolved node B (eNB) 210. In one example, the UE 220 can be adjacent to a cell edge within the cell that is being served by the serving eNB 210. A neighboring eNB 230 can be within a neighboring cell with respect to the cell that is served by the serving eNB 210. In other words, the serving eNB 210 and the neighboring eNB 230 can be located in neighboring cells. The neighboring eNB 230 can refer to an eNB that is causing signal interference for the UE 220 that is being served by the serving eNB 210. The neighboring eNB 230 can also be referred to as an aggressor eNB or an interfering eNB, i.e., because this eNB is interfering with uplink (UL) and/or downlink (DL) transmissions at the UE 220. The serving eNB 210 can also be referred to as a victim eNB. The serving eNB 210 can be considered a "victim" because UEs that are being served by the serving eNB 210 can endure signal interference from the neighboring eNB 230. The UE 220 can also be considered a "victim" because of the signal interference endured at the UE 220 from the neighboring eNB 230.

The UE 220 can periodically receive the semi-static signaling from the neighboring evolved node B (eNB) 230 via the serving eNB 210. For example, the neighboring eNB 230 can communicate the semi-static signaling to the serving eNB 210 via a backhaul link 215, and then the serving eNB 210 can forward the semi-static signaling to the UE 220. In one example, the serving eNB 210 can forward the semi-static signaling to the UE 220 via a unicast transmission. The semi-static signaling can include possible configurations of signal parameters used at the neighboring eNB 230. In other words, the possible configurations of signal parameters can describe or characterize interfering signals transmitted from the neighboring eNB 230. The UE 220 can use the possible configurations of signal parameters in the semi-static signaling to reduce or suppress interference from the neighboring eNB 230. For example, the UE 220 can perform blind decoding using the possible configurations of signal parameters in order to reduce interference from the neighboring eNB 230. If the UE 220 learns of the possible configurations of signal parameters that are being implemented at the neighboring eNB 230, then the UE 220 can use this information to reduce the effect of the interfering signals on the UE 220.

In one example, the semi-static signaling can include possible configurations of a physical resource block (PRB) allocation granularity used at the neighboring eNB 230. The neighboring eNB 230 can schedule UEs that are being served by the neighboring eNB 230 using chunks of PRBs. The neighboring eNB 230 can use different resource allocation granularities based on traffic conditions, whether Voice over Internet Protocol (VoIP) is being used, etc. As non-limiting examples, possible configurations of PRB allocation granularities can include one PRB or four PRBs, and these possible configurations can be provided to the UE 220. The UE 220 can use the PRB allocation granularities to reduce interference from the neighboring eNB 230.

The semi-static signaling can include a subset of supported transmission modes at the neighboring eNB 230. For example, the semi-static signaling can indicate that both transmission mode (TM) 9 and TM10 are supported at the neighboring eNB 230. In other words, the semi-static signaling can indicate that both TM9 and TM10 are supported at the neighboring eNB 230, but may not indicate which specific TM is currently being used at the neighboring eNB 230. However, the UE 220 can use the subset of supported transmission modes to reduce interference from the neighboring eNB 230.

The semi-static signaling can include an indication that PRB hopping is used at the neighboring eNB 230. In some examples, the neighboring eNB 230 does not use distributed PRBs, but rather uses localized PRB allocations. The neighboring eNB 230 can use PRB hopping in certain situations. If the neighboring eNB 230 does use PRB hopping, the neighboring eNB 230 can indicate that PRB hopping is used in a given subframe. The UE 220 can adjust certain processing algorithms for such resource allocations when PRB hopping is performed by the neighboring eNB 230, which can allow the UE 220 to reduce interference from the neighboring eNB 230.

The semi-static signaling can include a maximum number of layers for downlink transmission. In other words, the semi-static signaling can provide the UE 220 with an upper bound on the number of layers that have been used at the neighboring eNB 230. The maximum number of layers can refer to a number of spatial layers used for downlink transmissions when multiple antennas are utilized. In previous solutions, the UE 220 would blindly detect how many layers were used in the neighboring eNB 230. In the current technology, the semi-static signaling can provide the UE 220 with the maximum number of layers (or a possible range of the maximum number of layers), such that the complexity of reducing the interference can be reduced due to less blind decoding estimation at the UE 220.

The semi-static signaling can include a maximum modulation order used at the neighboring eNB 230. The modulation order can refer to a number of bits per resource element (RE). For example, the modulation order can range from 2 to 6. In one example, the semi-static signaling can include a possible range of the maximum modulation order (e.g., 4 or 6 bits per RE), such that the complexity of reducing the interference can be reduced due to less blind decoding estimation at the UE 220. In other words, providing the UE 220 with a range for the maximum modulation order can reduce blind detection complexity at the UE 220 since the UE 220 does not have to search through all possible modulations.

The semi-static signaling can include a subset of the scrambling identities for transmission mode 10 (TM10). If there are scrambling codes used for reference signals in TM10, these scrambling codes can be initialized. In other words, the neighboring eNB 230 can use a set of these scrambling codes. The indexes of the scrambling content used by the neighboring eNB 230 can be included in the semi-static signaling. The scrambling identities can be included in the semi-static signaling to the UE 220 in order to reduce the complexity of blind detection of the scrambling sequence used by the neighboring eNB 230

Therefore, the semi-static signaling can include potential configurations of signal parameters, such as the PRB allocation granularity, the subset of supported transmission modes, the indication of whether PRB hopping is used at the neighboring eNB 230, the maximum number of layers for downlink transmission, the maximum modulation order, an uplink-downlink configuration of a frame, a subset of power offsets values, and/or the subset of scrambling identities for the defined transmission mode. Although the UE 220 can use the potential configurations of signal parameters in the semi-static signaling to perform blind detection and reduce the signal interference from the neighboring eNB 230, the amount of blind detection performed can be overly complex for the UE 220 and consume a large amount of the UE's power. Since the semi-static signaling can often only provide a range of possible values or signal parameter configurations, the UE 220 still has to consume a relatively large amount of computing power to go through the possible signal parameter configurations included in the semi-static signaling. In addition, the periodic nature of the semi-static signaling can result in the potential configurations of signal parameters being outdated. In other words, the neighboring eNB 230 can modify one of its signal parameters, but the UE 220 may not learn of the modification for a relatively long period of time because updated semi-static signaling is not frequently provided to the UE 220. As a result, the UE 220 may attempt to perform blind detection using outdated signal parameter configurations, which can reduce a likelihood of the UE 220 successfully reducing or suppressing the interference from the neighboring eNB 230.

In one configuration, the neighboring eNB 230 can send dynamic signaling to the UE 220 that includes a subset of the potential configurations of signal parameters. The neighboring eNB 230 can send the dynamic signaling in addition to the semi-static signaling. The signal parameters included in the dynamic signaling can be currently used in a given downlink subframe or a set of downlink subframes at the neighboring eNB 230. In one example, the subset of the potential configurations of signal parameters is an actual configuration of signal parameters used at the neighboring eNB 230 (as opposed to a range of possible configurations as provided in the semi-static signaling). Alternatively, the subset of the potential configurations of signal parameters can be a refined (or reduced) range of possible signal parameter configurations, as compared to the potential configurations of signal parameters included in the semi-static signaling. In other words, the information included in the dynamic signaling can be a subset of the information previously included in the semi-static signaling.

The neighboring eNB 230 can be triggered to send the dynamic signaling upon selecting at least one of the potential configurations of signal parameters or modifying signal parameters in an existing configuration. In one example, the neighboring eNB 230 can broadcast the dynamic signaling. The UE 220 can detect the broadcast and determine that one or more signal parameter configurations at the neighboring eNB 230 have been modified. In an alternative configuration, the neighboring eNB 230 can send the dynamic signaling to the serving eNB 210 via the backhaul link 215, and the serving eNB 210 can forward the dynamic signaling to the UE 220. However, sending the dynamic signaling via the serving eNB 210 can result in additional signaling when the neighboring eNB 230 updates or modifies an existing configuration of signal parameters.

The UE 220 can use the dynamic signaling broadcasted from the neighboring eNB 230 (as well as the semi-static signaling) to perform blind detection and reduce interference from the neighboring eNB 230. The dynamic signaling can be an actual configuration of signal parameters used at the neighboring eNB 230 (or a reduced range of possible configurations of signal parameters). Thus, the UE 220 can more efficiently perform blind detection (as compared to using only the semi-static signaling) in order to reduce the interference from the neighboring eNB 230. In addition, the dynamic signaling can be more accurate and up-to-date as compared to the semi-static signaling. As a result, the UE 220 can more quickly become aware of modifications at the neighboring eNB 230 and accordingly alter the UE's interference reduction or suppression techniques to account for the modified signal parameters used at the neighboring eNB 230.

The dynamic signaling can include the subset of the potential configurations of signal parameters, such as an updated PRB allocation granularity, an updated subset of supported transmission modes, an updated indication of whether PRB hopping is used at the neighboring eNB 230, an updated maximum number of layers for downlink transmission, an updated maximum modulation order, an updated uplink-downlink configuration of a frame, an updated subset of power offsets values, and/or an updated subset of scrambling identities for a defined transmission mode. The UE can use the subset of the potential configurations of signal parameters (or the updated signal parameter configurations) in the dynamic signaling to reduce the signal interference from the neighboring eNB 230. As previously described, the subset can include a reduced set of possible signal parameter configuration or an actual signal parameter configuration used at the neighboring eNB 230.

In one example, the UE 220 can use both dynamic signaling and semi-static signaling to reduce interference from the neighboring eNB 230. As a non-limiting example, the UE 220 can use semi-static signaling for the PRB allocation granularity, PRB hopping, and the maximum number of layers for downlink transmission, and dynamic signaling for the transmission modes, the maximum modulation order, and scrambling identities in order to reduce the interference from the neighboring eNB 230.

In one example, the neighboring eNB 230 can initially send semi-static signaling to the UE 220 that indicates a PRB allocation granularity of four PRBs. However, four PRBs may not be ideal for certain situations (e.g., VoIP UEs that typically have narrow band allocations). Therefore, the neighboring eNB 230 can dynamically change the resource allocation to a smaller size, such as one PRB, in order to deliver VoIP traffic. The neighboring eNB 230 can dynamically inform the UE 220 of the updated PRB allocation granularity using dynamic signaling that is broadcasted to the UE 220. Thus, the neighboring eNB 230 can indicate that the resource allocation granularity has been changed from four PRBs to one PRB. The dynamic signaling can be a direct indication from the neighboring eNB 230 on the actual resource allocation granularity that is currently being used on a given subframe or a set of subframes at the neighboring eNB 230.

In another example, the neighboring eNB 230 can initially send semi-static signaling to the UE 220 indicating that both TM9 and TM10 are supported at the neighboring eNB 230. In other words, the neighboring eNB 230 can indicate that either TM9 or TM10 can be used. At a later time, the neighboring eNB 230 can send dynamic signaling indicating that TM10 is currently being used in a given subframe. Thus, the UE 220 can use the updated transmission mode when performing interference suppression.

In yet another example, the neighboring eNB 230 can initially send semi-static signaling to the UE 220 indicating a defined range for a maximum number of layers for downlink transmissions used at the neighboring eNB 230. At a later time, the neighboring eNB 230 can send dynamic signaling indicating a reduced range (as compared to the defined range previously included in the semi-static signaling) for the maximum number of layers for downlink transmissions. Since the neighboring eNB 230 can dynamically change the maximum number of layers from one downlink subframe to another downlink subframe, the dynamic signaling enables the UE 220 to receive an updated indication of the maximum number of layers in a timely manner. Similarly, the neighboring eNB 230 can dynamically change the maximum modulation order, and therefore, the dynamic signaling enables the UE 220 to receive an updated indication of the maximum modulation order in a timely manner.

In one example, the UE 220 can reduce interference based on a specific transmission mode used in a given PRB at the neighboring eNB 230. In previous solutions, the UE 220 would perform blind detection among all possible transmission modes (e.g., TM 1-10). The UE 220 would blindly detect, for each PRB, an actual transmission mode used by the neighboring eNB 230. In the present technology, the complexity can be reduced at the UE when the neighboring eNB 230 generates two possible subsets of the transmission modes. A first subset can be TM 1-5 and the second subset can be TM 5-10. The neighboring eNB 230 can send the first subset and the second subset to the UE 220 in the semi-static signaling. At a later time, the neighboring eNB 230 can indicate the subset of TM 1-5 is being utilized via dynamic signaling that is provided to the UE 220, which can reduce the search space (and complexity) for the UE 220. In an alternative example, the dynamic signaling can indicate to the UE 220 that TM3 or TM4 is being used at the neighboring eNB 230. The UE 220 can use this information to determine how the signal is structured in the neighboring cell, and the UE 220 can accordingly suppress the interference using this information.

In one example, the neighboring eNB 230 can be configured with two PRB allocation granularities of one PRB pair and X adjacent PRB pairs, wherein X is an integer greater than one. In one example, X can be equal to a resource block group (RBG). Depending on an actual scheduling decision performed at the neighboring eNB 230, either a first allocation granularity or a second allocation granularity can be signaled to the UE 220. In another example, two subsets of the transmission modes can be configured, e.g. {TM2, TM3, TM4} or {TM1-10}. Depending on an actual scheduling decision performed at the neighboring eNB 230, an actual set of the transmission modes from the two subsets can be provided to the UE 220. In another example, PRB hopping can be enabled or disabled depending on a scheduling decision performed at the neighboring eNB 230. Actual information on the use of PRB hopping can be provided to the UE 220 via dynamic signaling.

Based on the dynamic signaling received from the neighboring eNB 230, the UE 220 can understand which parameters among the semi-static signaling are actually used in given downlink subframes at the neighboring eNB 230. As a result, the UE 220 can more effectively cancel the interference from the neighboring eNB 230. By knowing the actual signal parameters (as well as possible signal parameters from the semi-static signaling), the UE 220 can detect how the interfering signal is structured in the neighboring cell, and accordingly suppress the interfering signal. In addition, the UE 220 can use less computational capacity to reduce the interference based on the dynamic signaling. Without the dynamic signaling, the UE 220 may have to perform blind detection among all possible values in the potential signal parameter configurations, which can result in a large amount of computation. If the actual signal parameter values (or a reduced subset of possible signal parameter values) are provided to the UE in the dynamic signaling, the UE 220 can blindly detect a reduced number of values.

Figure 3:
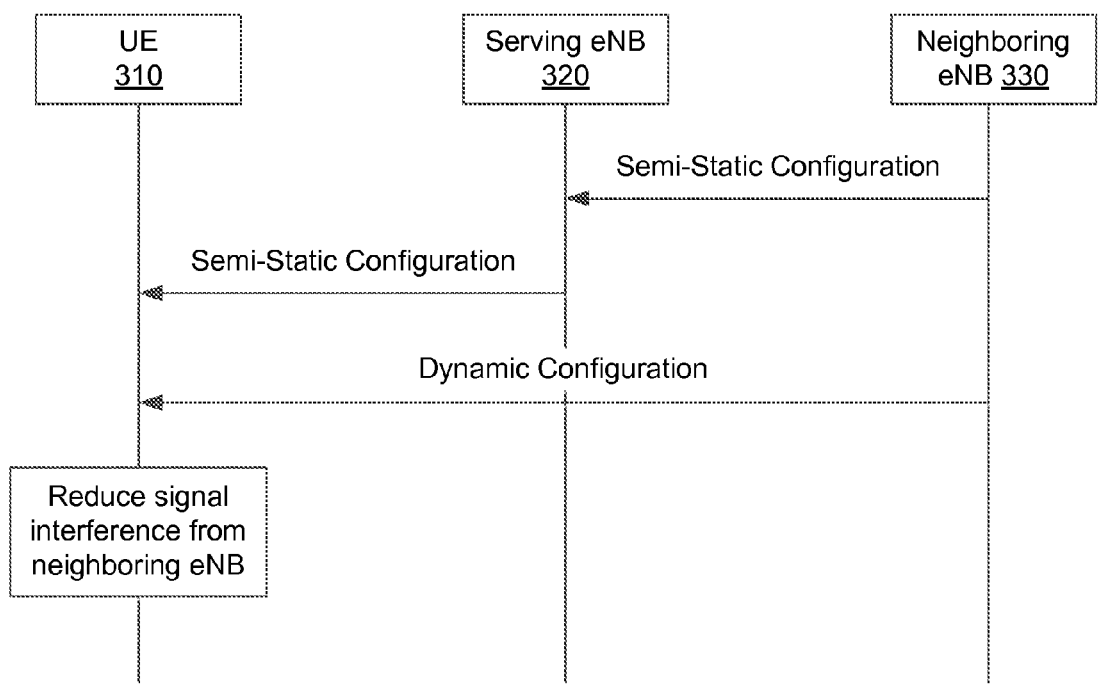
FIG. 3 illustrates semi-static signaling between a neighboring evolved node B (eNB) and a user equipment (UE) via a serving eNB and dynamic signaling directly between the neighboring eNB and the UE for interference mitigation at the UE in accordance with an example.

FIG. 3 illustrates semi-static signaling between a neighboring evolved node B (eNB) 330 and a user equipment (UE) 310 via a serving eNB 320 and dynamic signaling directly between the neighboring eNB 330 and the UE 310. The neighboring eNB 330 can periodically send the semi-static signaling to the serving eNB 320, and the serving eNB 320 can forward the semi-static signaling to the UE 310. The semi-static signaling can include potential configurations of signal parameters used at the neighboring eNB 330. For example, the semi-static signaling can include a physical resource block (PRB) allocation granularity, a subset of supported transmission modes, an indication that PRB hopping is used at the neighboring eNB, a maximum number of layers for downlink transmission, a maximum modulation order, an uplink-downlink configuration of a frame, a subset of power offsets values, and/or a subset of scrambling identities for a defined transmission mode. The UE 310 can use the semi-static signaling to reduce inference from the neighboring eNB 330. In addition, the UE 310 can receive the dynamic signaling from the neighboring eNB 330. The dynamic signaling can include updated potential configurations of the signal parameters used at the neighboring eNB 330. In addition, the dynamic signaling can include actual configurations and/or a reduced subset of potential configurations used at the neighboring eNB 330. By using both the semi-static signaling and the dynamic signaling, the UE 310 can perform interference reduction or suppression using a reduced amount of computing and power consumption.

Figure 4:
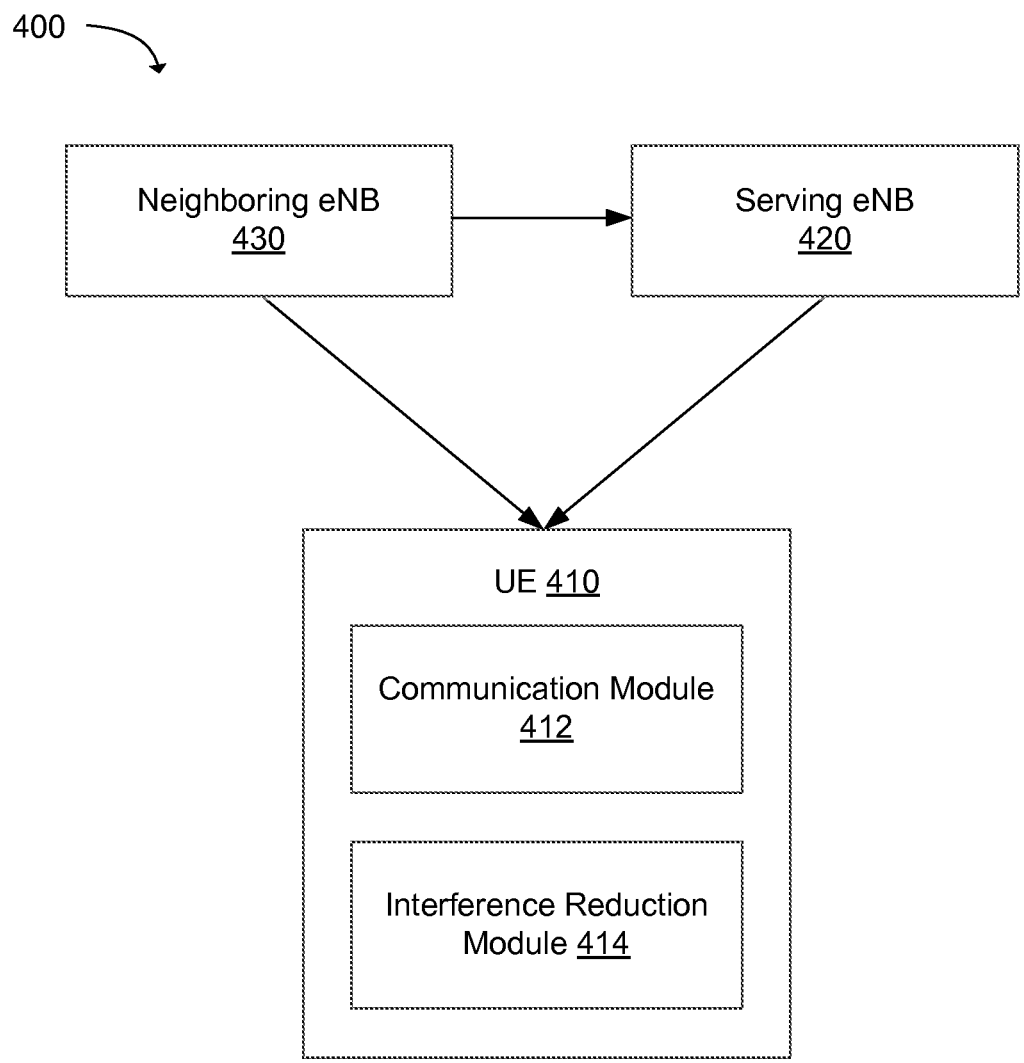
FIG. 4 illustrates functionality of a user equipment (UE) operable to reduce signal interference in accordance with an example.

Another example provides functionality 400 of a user equipment (UE) 410 operable to reduce signal interference, as shown in FIG. 4. The UE 410 can include a communication module 412 configured to receive semi-static signaling from a neighboring evolved node (eNB) 430 via a serving eNB 420. The semi-static signaling can include potential configurations of signal parameters used at the neighboring eNB 430. The UE 410 can be located within a cell that is served by the serving eNB 420. The communication module 412 can be configured to receive, at the UE 410, dynamic signaling directly from the neighboring eNB 430 that includes a subset of the potential configurations of signal parameters used in a given downlink subframe at the neighboring eNB 430. The UE 410 can include an interference reduction module 414 configured to reduce signal interference at the UE 410 caused by the neighboring eNB 430 using the semi-static signaling that includes the potential configurations of signal parameters and the dynamic signaling that includes the subset of the potential configurations of signal parameters.

In one example, the communication module 412 can be further configured to receive the dynamic signaling from the neighboring eNB 430 via a physical downlink control channel (PDCCH) or an enhanced PDCCH (EPDCCH). The communication module 412 can be further configured to receive the semi-static signaling from the serving eNB 420 via radio resource control (RRC) signaling. The communication module 412 can be further configured to receive the semi-static and dynamic signaling from the neighboring eNB 430 according to a defined periodicity.

In one example, the subset of the potential configurations of signal parameters is an actual configuration of signal parameters used at the neighboring eNB 430. In another example, the UE 410 is located adjacent to a cell edge within the cell that is served by the serving eNB 420 and endures signal interference from the neighboring eNB 430. In yet another example, the neighboring eNB 430 is located within a neighboring cell in proximity to the serving eNB 420 that is serving the UE.

In one example, the communication module 412 can be further configured to receive the semi-static signaling via a unicast transmission from the serving eNB 420, wherein the serving eNB 420 receives the semi-static signaling from the neighboring eNB 430 via a backhaul link. In another example, the potential configurations of signal parameters in the semi-static signaling and the subset of the potential configurations of signal parameters in the dynamic signaling include at least one of: a physical resource block (PRB) allocation granularity; a subset of supported transmission modes; an indication that PRB hopping is used at the neighboring eNB; a maximum number of layers for downlink transmissions; a maximum modulation order; an uplink-downlink configuration of a frame; a subset of power offsets values; or a subset of scrambling identities for UE-specific reference signals for a defined transmission mode.

In one example, the interference reduction module 414 can be further configured to perform blind detection in order to reduce the signal interference caused by the neighboring eNB 430. The UE 410 can perform the blind detection using at least one of the potential configurations of signal parameters in the semi-static signaling or the subset of the potential configurations of signal parameters in the dynamic signaling. In another example, the communication module 412 can be further configured to receive the dynamic signaling from the neighboring eNB 430 in response to the neighboring eNB 430 selecting at least one of the potential configurations of signal parameters or modifying signal parameters in an existing configuration. In yet another example, the communication module 412 can be further configured to receive the dynamic signaling from the neighboring eNB 430 via a broadcast transmission.

Figure 5:
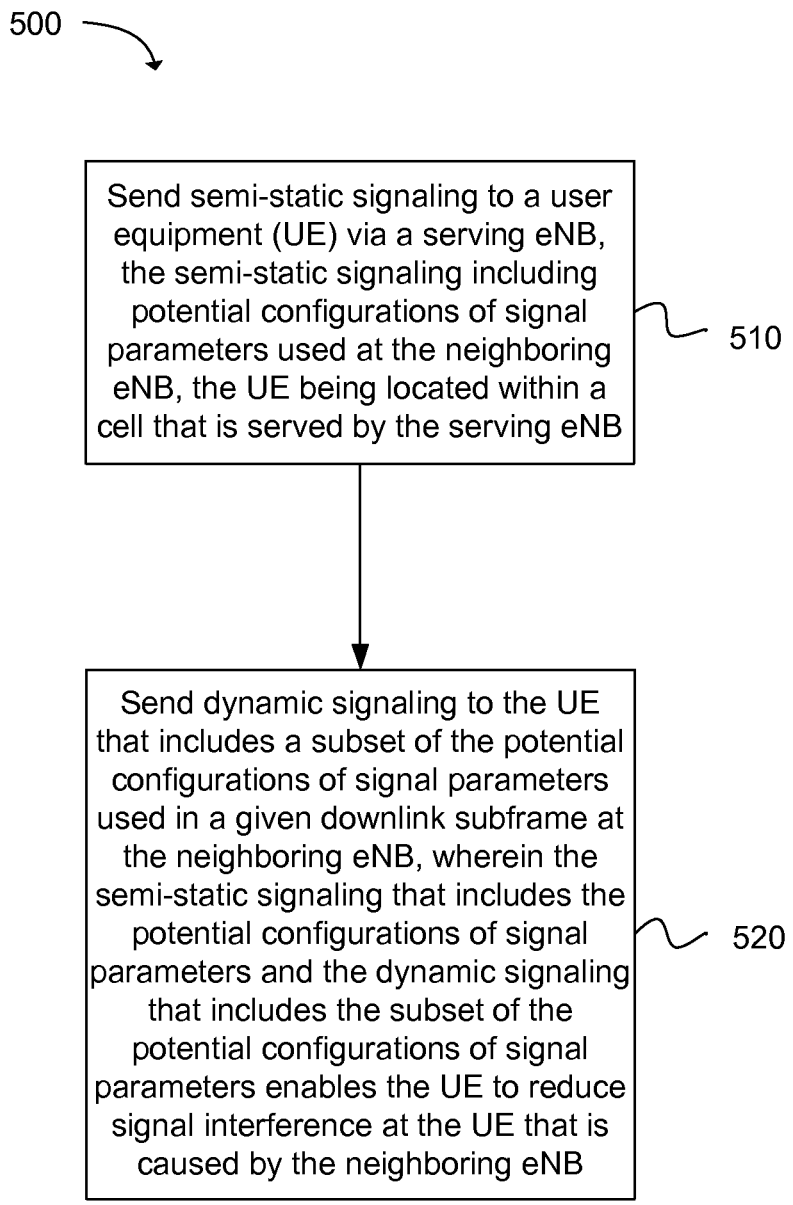
FIG. 5 depicts functionality of a neighboring evolved node B (eNB) operable to facilitate reduction of signal interference in accordance with an example.

Another example provides functionality 500 of a neighboring evolved node B (eNB) operable to operable to facilitate reduction of signal interference, as shown in the flow chart in FIG. 5. The functionality can be implemented as a method or the functionality can be executed as instructions on a machine, where the instructions are included on at least one computer readable medium or one non-transitory machine readable storage medium. The neighboring eNB can include one or more processors configured to send semi-static signaling to a user equipment (UE) via a serving eNB, the semi-static signaling including potential configurations of signal parameters used at the neighboring eNB, the UE being located within a cell that is served by the serving eNB, as in block 510. The neighboring eNB can include one or more processors configured to send dynamic signaling to the UE that includes a subset of the potential configurations of signal parameters used in a given downlink subframe at the neighboring eNB, as in block 520. In one example, the semi-static signaling that includes the potential configurations of signal parameters and the dynamic signaling that includes the subset of the potential configurations of signal parameters enables the UE to reduce signal interference at the UE that is caused by the neighboring eNB.

In one example, the neighboring eNB can include one or more processors further configured to send the semi-static signaling to the UE according to a defined periodicity. In another example, the neighboring eNB can include one or more processors further configured to send the dynamic signaling to the UE in response to selecting at least one of the potential configurations of signal parameters or modifying signal parameters in an existing configuration. In yet another example, the UE that is enduring the signal interference from the neighboring eNB is located adjacent to a cell edge within the cell that is being served by the serving eNB. In addition, the neighboring eNB is located within a neighboring cell in proximity to the serving eNB that is serving the UE.

In one example, the neighboring eNB can include one or more processors further configured to send the semi-static signaling to the serving eNB over a backhaul link, wherein the serving eNB forwards the semi-static signaling to the UE via a unicast transmission to the UE. In another example, the potential configurations of signal parameters in the semi-static signaling and the subset of the potential configurations of signal parameters in the dynamic signaling include at least one of: a physical resource block (PRB) allocation granularity; a subset of supported transmission modes; an indication that PRB hopping is used at the neighboring eNB; a maximum number of layers for downlink transmissions; a maximum modulation order; a uplink-downlink configuration of the frame; a subset of power offsets values; or a subset of scrambling identities for UE-specific reference signals for a defined transmission mode. In yet another example, the neighboring eNB can include one or more processors further configured to send the dynamic signaling to the UE via a broadcast transmission.

Figure 6:
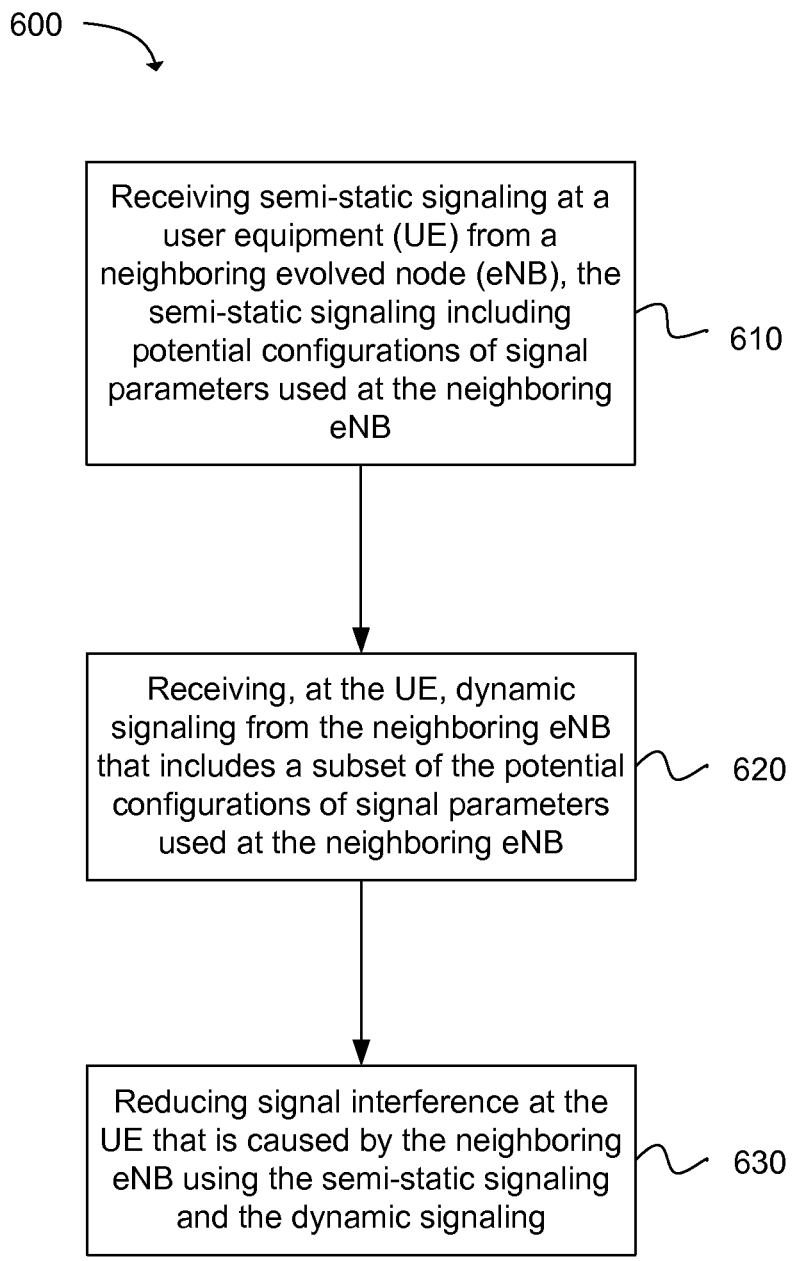
FIG. 6 depicts a flowchart of a method for reducing signal interference in accordance with an example.

Another example provides a method 600 for reducing signal interference, as shown in the flow chart in FIG. 6. The method can be executed as instructions on a machine, where the instructions are included on at least one computer readable medium or one non-transitory machine readable storage medium. The method can include the operation of receiving semi-static signaling at a user equipment (UE) from a neighboring evolved node (eNB), the semi-static signaling including potential configurations of signal parameters used at the neighboring eNB, as in block 610. The method can include the operation of receiving, at the UE, dynamic signaling from the neighboring eNB that includes a subset of the potential configurations of signal parameters used at the neighboring eNB, as in block 620. The method can include the operation of reducing signal interference at the UE that is caused by the neighboring eNB using the semi-static signaling and the dynamic signaling, as in block 630.

In one example, the method can further include the operation of performing blind detection using the semi-static signaling and the dynamic signaling in order to reduce the signal interference caused by the neighboring eNB. In another example, the subset of the potential configurations of signal parameters is an actual configuration of signal parameters used at the neighboring eNB. In yet another example, the method can include the operation of receiving the semi-static signaling from the neighboring eNB via a unicast transmission from the serving eNB, wherein the serving eNB receives the semi-static signaling from the neighboring eNB via a backhaul link. In addition, the method can include the operations of receiving the semi-static signaling from the neighboring eNB according to a defined periodicity; and receiving the dynamic signaling from the neighboring eNB in response to the neighboring eNB selecting at least one of the potential configurations of signal parameters or modifying signal parameters in an existing configuration.

Figure 7:
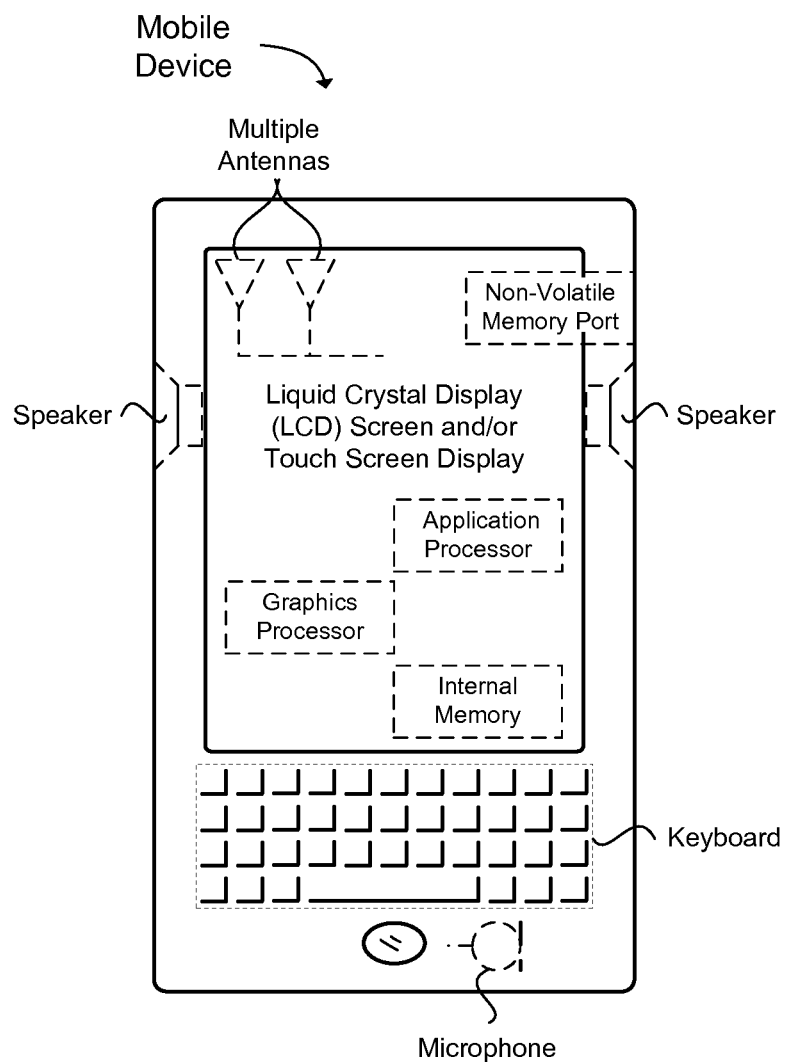
FIG. 7 illustrates a diagram of a wireless device (e.g., UE) in accordance with an example.

FIG. 7 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to reduce signal interference, the UE comprising:
    a communication module configured to:
        receive semi-static signaling from a neighboring evolved node (eNB) via a serving eNB, the semi-static signaling including potential configurations of signal parameters used at the neighboring eNB, the UE being located within a cell that is served by the serving eNB; and
        receive, at the UE, dynamic signaling directly from the neighboring eNB that includes a subset of the potential configurations of signal parameters used in a given downlink subframe at the neighboring eNB, wherein the communication module is stored in a digital memory device or is implemented in a hardware circuit; and
    an interference reduction module configured to reduce signal interference at the UE caused by the neighboring eNB using the semi-static signaling that includes the potential configurations of signal parameters and the dynamic signaling that includes the subset of the potential configurations of signal parameters, wherein the interference reduction module is stored in a digital memory device or is implemented in a hardware circuit.

2. The UE of claim 1, wherein the communication module is further configured to receive the dynamic signaling from the neighboring eNB via a physical downlink control channel (PDCCH) or an enhanced PDCCH (EPDCCH).

3. The UE of claim 1, wherein the communication module is further configured to receive the semi-static signaling from the serving eNB via radio resource control (RRC) signaling.

4. The UE of claim 1, wherein the communication module is further configured to receive the semi-static signaling from the neighboring eNB according to a defined periodicity.

5. The UE of claim 1, wherein the subset of the potential configurations of signal parameters is an actual configuration of signal parameters used at the neighboring eNB.

6. The UE of claim 1, wherein the UE is located adjacent to a cell edge within the cell that is served by the serving eNB and endures signal interference from the neighboring eNB.

7. The UE of claim 1, wherein the neighboring eNB is located within a neighboring cell in proximity to the serving eNB that is serving the UE.

8. The UE of claim 1, wherein the communication module is further configured to receive the semi-static signaling via a unicast transmission from the serving eNB, wherein the serving eNB receives the semi-static signaling from the neighboring eNB via a backhaul link.

9. The UE of claim 1, wherein the potential configurations of signal parameters in the semi-static signaling and the subset of the potential configurations of signal parameters in the dynamic signaling include at least one of:
- a physical resource block (PRB) allocation granularity;
- a subset of supported transmission modes;
- an indication that PRB hopping is used at the neighboring eNB;
- a maximum number of layers for downlink transmissions;
- a maximum modulation order;
- an uplink-downlink configuration of a frame;
- a subset of power offsets values; or
- a subset of scrambling identities for UE-specific reference signals for a defined transmission mode.

10. The UE of claim 1, wherein the interference reduction module is further configured to perform blind detection in order to reduce the signal interference caused by the neighboring eNB, the UE performing the blind detection using at least one of the potential configurations of signal parameters in the semi-static signaling or the subset of the potential configurations of signal parameters in the dynamic signaling.

11. The UE of claim 1, wherein the communication module is further configured to receive the dynamic signaling from the neighboring eNB in response to the neighboring eNB selecting at least one of the potential configurations of signal parameters or modifying signal parameters in an existing configuration.

12. The UE of claim 1, wherein the communication module is further configured to receive the dynamic signaling from the neighboring eNB via a broadcast transmission.

13. A neighboring evolved node B (eNB) operable to facilitate reduction of signal interference, the neighboring eNB having one or more processors configured to:
- send semi-static signaling to a user equipment (UE) via a serving eNB, the semi-static signaling including potential configurations of signal parameters used at the neighboring eNB, the UE being located within a cell that is served by the serving eNB; and
- send dynamic signaling to the UE that includes a subset of the potential configurations of signal parameters used in a given downlink subframe at the neighboring eNB,
- wherein the semi-static signaling that includes the potential configurations of signal parameters and the dynamic signaling that includes the subset of the potential configurations of signal parameters enables the UE to reduce signal interference at the UE that is caused by the neighboring eNB.

14. The neighboring eNB of claim 13, wherein the one or more processors are further configured to send the semi-static signaling to the UE according to a defined periodicity.

15. The neighboring eNB of claim 13, wherein the one or more processors are further configured to send the dynamic signaling to the UE in response to selecting at least one of the potential configurations of signal parameters or modifying signal parameters in an existing configuration.

16. The neighboring eNB of claim 13, wherein the UE that is enduring the signal interference from the neighboring eNB is located adjacent to a cell edge within the cell that is being served by the serving eNB.

17. The neighboring eNB of claim 13, wherein the neighboring eNB is located within a neighboring cell in proximity to the serving eNB that is serving the UE.

18. The neighboring eNB of claim 13, wherein the one or more processors are further configured to send the semi-static signaling to the serving eNB over a backhaul link, wherein the serving eNB forwards the semi-static signaling to the UE via a unicast transmission to the UE.

19. The neighboring eNB of claim 13, wherein the potential configurations of signal parameters in the semi-static signaling and the subset of the potential configurations of signal parameters in the dynamic signaling include at least one of:
- a physical resource block (PRB) allocation granularity;
- a subset of supported transmission modes;
- an indication that PRB hopping is used at the neighboring eNB;
- a maximum number of layers for downlink transmissions;
- a maximum modulation order;
- a uplink-downlink configuration of the frame;
- a subset of power offsets values; or
- a subset of scrambling identities for UE-specific reference signals for a defined transmission mode.

20. The neighboring eNB of claim 13, wherein the one or more processors are further configured to send the dynamic signaling to the UE via a broadcast transmission.

21. A method for reducing signal interference, the method comprising:
- receiving semi-static signaling at a user equipment (UE) from a neighboring evolved node (eNB), the semi-static signaling including potential configurations of signal parameters used at the neighboring eNB;
- receiving, at the UE, dynamic signaling from the neighboring eNB that includes a subset of the potential configurations of signal parameters used at the neighboring eNB; and
- reducing signal interference at the UE that is caused by the neighboring eNB using the semi-static signaling and the dynamic signaling.

22. The method of claim 21, further comprising performing blind detection using the semi-static signaling and the dynamic signaling in order to reduce the signal interference caused by the neighboring eNB.

23. The method of claim 21, wherein the subset of the potential configurations of signal parameters is an actual configuration of signal parameters used at the neighboring eNB.

24. The method of claim 21, further comprising receiving the semi-static signaling from the neighboring eNB via a unicast transmission from the serving eNB, wherein the serving eNB receives the semi-static signaling from the neighboring eNB via a backhaul link.

25. The method of claim 21, further comprising:
- receiving the semi-static signaling from the neighboring eNB according to a defined periodicity; and
- receiving the dynamic signaling from the neighboring eNB in response to the neighboring eNB selecting at least one of the potential configurations of signal parameters or modifying signal parameters in an existing configuration.

* * * * *